Feb. 2, 1937. C. H. WIDMAN 2,069,345
TRUNK COMPARTMENT
Filed Jan. 12, 1934 3 Sheets-Sheet 1
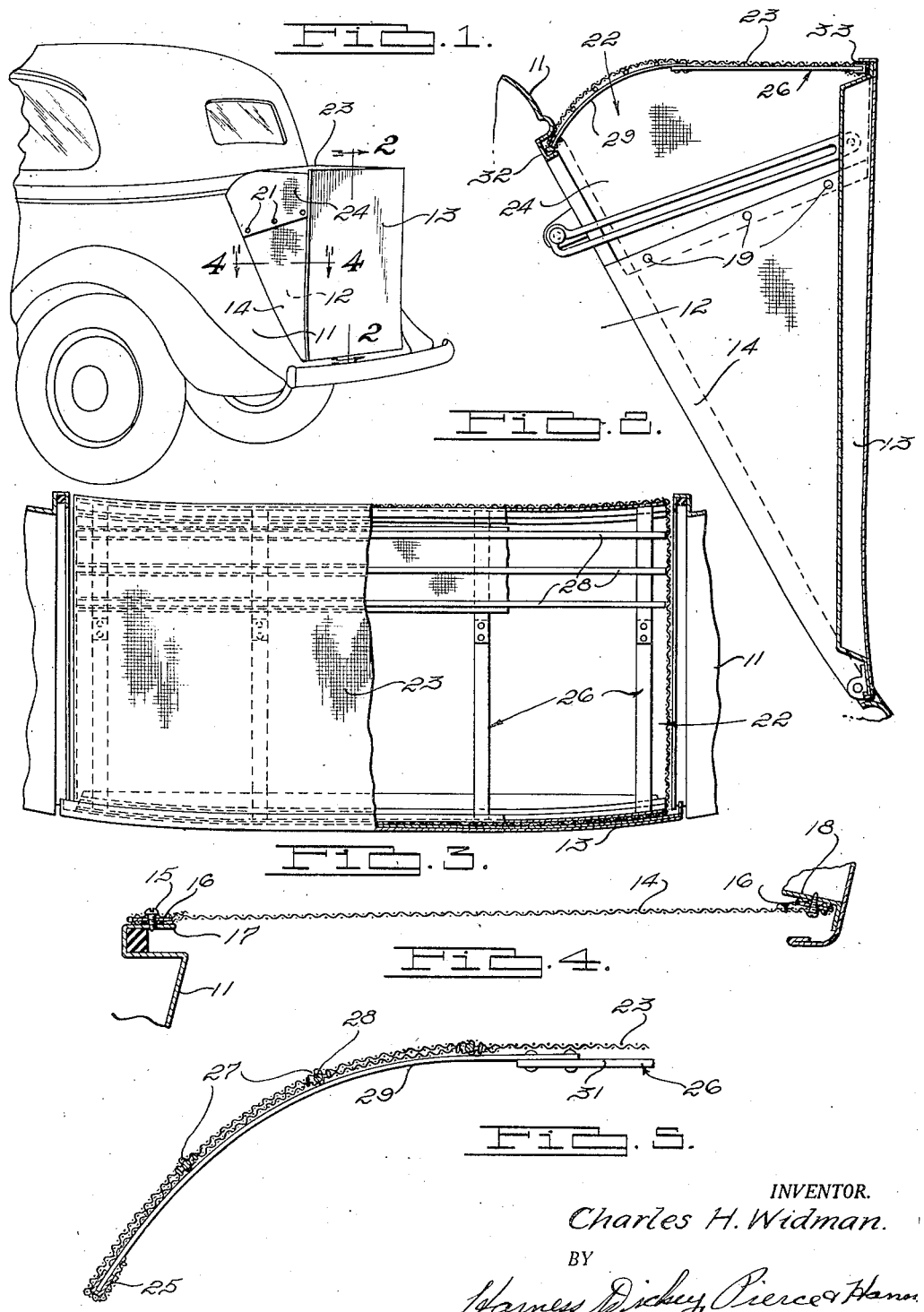
INVENTOR.
Charles H. Widman.
BY
Harness, Dickey, Pierce & Hann
ATTORNEYS.

Feb. 2, 1937. C. H. WIDMAN 2,069,345
TRUNK COMPARTMENT
Filed Jan. 12, 1934 3 Sheets-Sheet 2
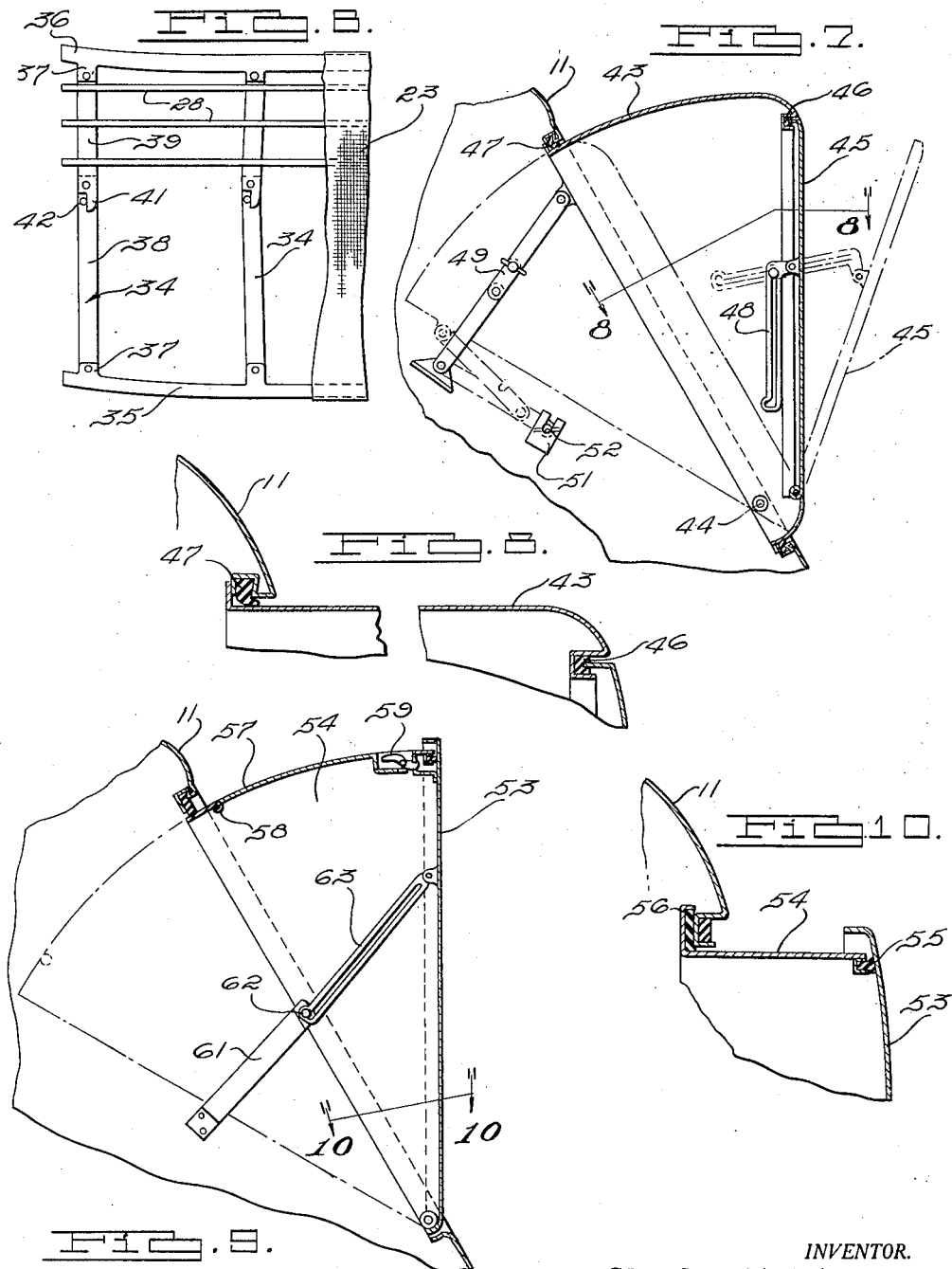
INVENTOR.
Charles H. Widman.
BY
Harness, Dickey, Pierce & Hann.
ATTORNEYS.

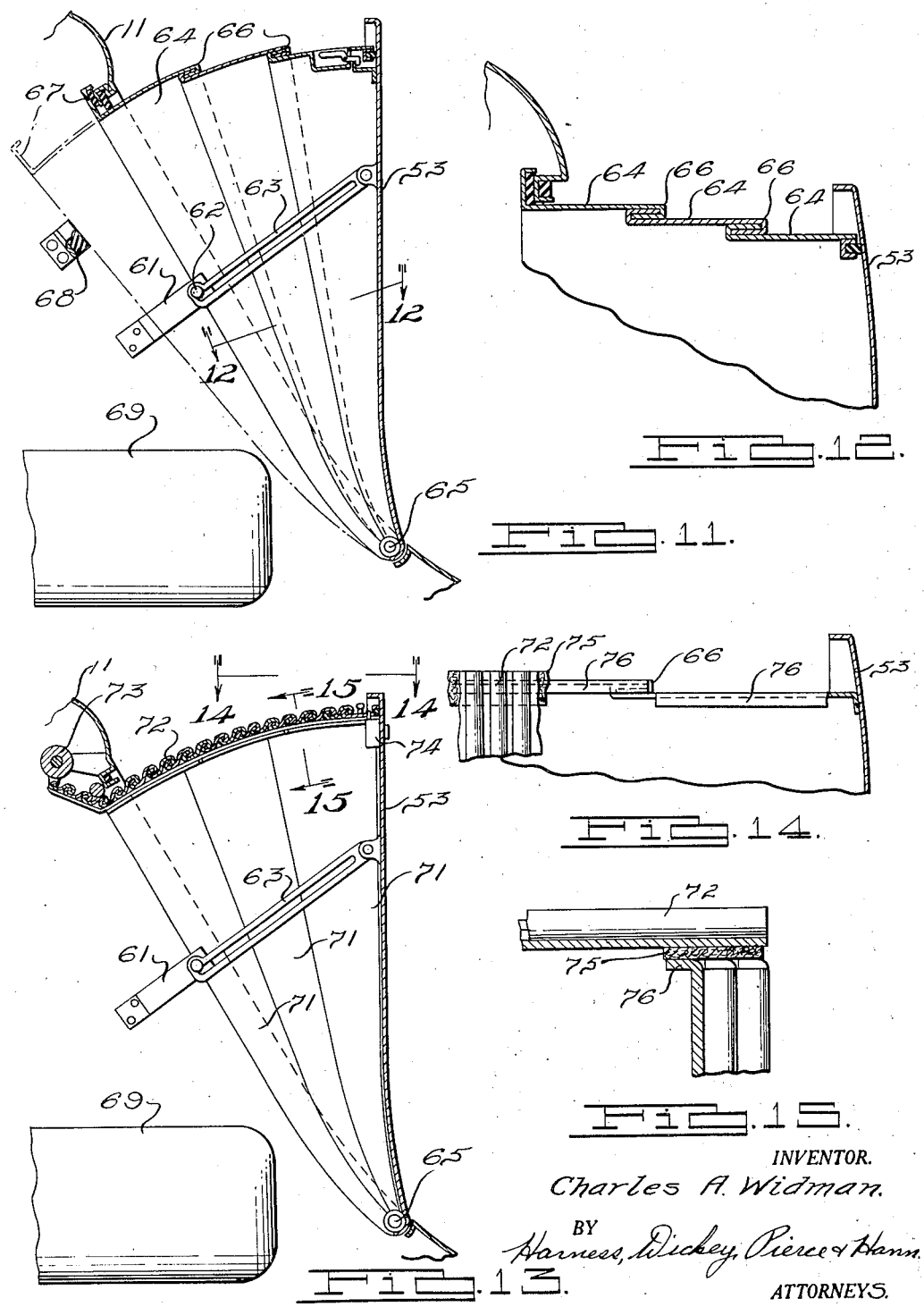

Patented Feb. 2, 1937

2,069,345

UNITED STATES PATENT OFFICE 2,069,345

TRUNK COMPARTMENT

Charles H. Widman, Detroit, Mich., assignor to The Murray Corporation of America, a corporation of Delaware Application January 12, 1934, Serial No. 706,315

3 Claims. (Cl. 296—37)

My invention relates to vehicle bodies and particularly to an extensible trunk compartment for the rear end thereof.

Trunks have been provided heretofore on the rear end of vehicle bodies as entirely separate elements or have been built in as permanent portions of the paneling of the vehicle. In the present invention I provide an enlargement for the compartment in the vehicle, which ordinarily is not visible, but which cooperates with the compartment door to form an extended trunk compartment for the body. The element may be entirely detachable from the body and closure elements or it may form a permanent disappearing part thereof which may be extended when desired to materially enlarge the compartment.

Accordingly, the main objects of my invention are to provide a vehicle body of the two or four door sedan type with a compartment in the rear thereof having a closure element for completely concealing the compartment from view; to provide an extension which spans the space between the body and the element when open for forming an extended trunk compartment at the rear of the vehicle; to provide a closure element for the space between the door and the body which is removable; to provide an element as a permanent part of the body which may be extended to span the space between the compartment closure element and the body to enlarge the compartment when the element is open; and, in general, to provide means for extending the compartment at the rear of a vehicle which may be employed only when desired, which is simple in construction and manipulation and which completely seals the compartment against the entrance of moisture.

Other objects and features of novelty of my invention will be either specifically pointed out or will become apparent when referring, for a better understanding of my invention, to the following description taken in conjunction with the accompanying drawings, wherein:

Figure 1 is a perspective view of a rear end of a vehicle embodying features of my invention, Fig. 2 is an enlarged sectional view of the structure illustrated in Fig. 1, taken on the line 2—2 thereof, Fig. 3 is an enlarged top plan view, partly in section, of the structure illustrated in Fig. 1, Fig. 4 is an enlarged sectional view of the structure illustrated in Fig. 1, taken on the line 4—4 thereof, Fig. 5 is an enlarged view of a portion of the structure illustrated in Fig. 2, Fig. 6 is a view of structure, similar to that illustrated in Fig. 3, showing a modified form thereof, Fig. 7 is a sectional view of a vehicle body, taken as on the line 7—7 of Fig. 1, showing a modified form of construction, Fig. 8 is an enlarged sectional view of the structure illustrated in Fig. 7, taken on the line 8—8 thereof, Fig. 9 is a view of structure, similar to that illustrated in Fig. 7, showing a modified form thereof, Fig. 10 is an enlarged sectional view of the structure illustrated in Fig. 9, taken on the line 10—10 thereof.

Fig. 11 is a view of structure, similar to that of Fig. 2, showing a modified form thereof, Fig. 12 is an enlarged sectional view of the structure illustrated in Fig. 11, taken on the line 12—12 thereof, Fig. 13 is a view of the structure, similar to that illustrated in Fig. 11, showing a modified form thereof, Fig. 14 is an enlarged sectional view of the structure illustrated in Fig. 13, taken on the line 14—14 thereof, and Fig. 15 is an enlarged sectional view of the structure illustrated in Fig. 13, taken on the line 15—15 thereof.

In Fig. 1, I have illustrated a vehicle body 11 having a rear compartment 12 therein which is normally sealed by a compartment closure element 13. The edge of the element 13 forms a water tight seal with the paneling of the body 11 at the marginal edges when disposed in a position to be in continuation of the paneling of the body. Normally the element may be opened to provide for the disposition of small packages within the compartment and may be constructed so as to support and carry the spare wheel of the vehicle.

When it is desired, however, to enlarge the compartment for the storage of small trunks, bags and the like, I have provided a removable cover which cooperates with the element 13 in the open position and with the paneling of the body 11, to form a trunk compartment in extension of the compartment 12 of the vehicle. In Figs. 1 to 5, I have illustrated a semi-permanent construction wherein a cloth material 14 spans the side space between the body and the element 13 when in opened position and permanently secured thereto by screws 15 which extend through metal strip 16 sewed in the edges of the material 14. The material is secured to a marginal flange 17 about the compartment opening of the body and to a web 18 along the side of the element 13. At the upper edge of the material 14, elements 19 of glove button fasteners are secured to engage the other element 21 thereof secured to the top compartment cover 22.

The compartment cover 22 comprises a top cloth material 23 having side extensions 24 thereon forming a unit element. At the front and rear edges the cloth material 23 is sewed over a U-shaped metal element 25 which is shaped longitudinally to conform to the shape of the vehicle body and the element 13. At spaced points the stitching is interrupted to provide pockets in which top ribs 26 are disposed to engage within the channel element 25. Additional pockets 27 are sewed longitudinally of the cover in which form maintaining rods 28 are disposed to prevent the top material from sagging between the ribs 26.

The cross ribs 26 are made flexible a portion of their length by the clock spring portion 29 which is riveted or otherwise secured to a rigid portion 31. The elements 26 are removable and are readily inserted in the channel elements 25 with the flexible end portions 29 disposed toward the vehicle to provide an arcuate shape to the cover element, as illustrated in Figs. 1, 2, and 5. The front edge of the cover 22 is disposed in the trough 32 at the top marginal edge of the opening and the rear edge head under the flange 33 of the element 13. When disposed in this manner it is only necessary to snap the button portions 21 on the projecting portions 19 on the side element 14, to completely seal the compartment when extended as illustrated in Figs. 1 and 2. When the compartment is not in use, it is only necessary to release the button 21 and to spring the cover 22 from between the body 11 and element 13 after which the ribs 26 may be removed and the cover 22 may be rolled up into a compact bundle for storage.

As a further extension of the invention, I have illustrated in Fig. 6 a different type of frame member 34 for the material 22 wherein the marginal elements 35 and 36 are provided with extended bosses 37 which are spanned by pivotal links 38 and 39. The links 39 are made of flexible material and are provided with an extension 41 which engages a pin 42 on the rigid links 38 to retain them in aligned extension. The pin 42 may be so located as to cause the links 38 and 39 to pass over center position to retain them in toggle locked relation. The two sets of links 38 and 39 illustrated in Fig. 6, are disposed to be collapsed by moving to the left while the two other sets of links on the right hand side of the cover (not shown) are disposed to be collapsed by moving inward to the left so as to have the top material fold in a compact bundle without the necessity of removing the cross links.

As a further extension of my invention, I have illustrated in Figs. 7 and 8, a construction wherein the compartment is enlarged by a permanent portion of the vehicle. A frame element 43 is pivoted at 44 to the marginal edge of the opening for pivotal movement relative to the compartment edge and is provided with a cover 45 which is hingedly supported at 46 in a position to be opened when the frame element 43 is retained inwardly of the body and also when extended, as illustrated in Fig. 7, to enlarge the compartment.

The cover 45 is sealed relative to the frame in the conventional manner as at 46 while the frame 43 is sealed relative to the compartment edge by the rubber sealing element 47 provided thereabout. A suitable limiting element 48 controls the amount of opening of the door 45 while a pair of pivotal links 49 retain the frame element 43 in extended or closed position. A suitable slotted bracket 51 is engaged by a clamping screw 52 on the links 49 to retain the frame 43 in closed position. The clamping screw 52 engages a slot in one of the links 49 when the frame 43 is intended to lock the frame in extended position. When disposed inwardly of the body, the frame slightly extends therebeyond, as illustrated in dot and dash line in Fig. 7.

In Figs. 9 and 10, I have shown a further extension of my invention wherein a cover 53 is mounted in the usual manner as in Fig. 1 while a frame element 54 is pivotally mounted on or adjacent to the door pivot. The cover 53 may be extended and sealed against the door and the marginal edge of the compartment opening, as illustrated in Fig. 10, by the rubber sealing elements 55 and 56, respectively. The frame 54 is provided with a hinged cover 57 at the top, hinged at 58 and provided with a recessed handle 59 by which the door is latched and moved to open position. A projecting arm 61 is secured to the vehicle body in spaced relation to the frame 54 having a pin 62 on the end thereof to which a suitable positioning arm 63 may be latched to retain the cover 53 in extended position. The frame 54 is retained extended, as illustrated in the figure, by an offset portion in the end of the arm 61 which engages the rear end of the frame 54 to retain it in fixed relation to the open cover 53 and sealed by the element 56 to the body.

After the cover 53 has been opened, the frame 54 may be grasped from the inside and pulled out part way after which it is engaged from the outside and moved to its outermost position. After the frame 54 is extended, entrance is had to the compartment through the hinged cover 57 at the top thereof. The extensible frame 54 is invisible from the exterior of the vehicle when the cover 53 is moved to closed position with a vehicle body and may be operated independent of the frame 54. However, when an extension of the compartment is desired, it is only necessary to pivot the frame 54 outwardly against the door to provide the enlarged compartment.

I have shown a further modified construction in Figs. 11 and 12, wherein the compartment door 53 operates similar to the door 53 in Fig. 9. A closure is provided for the opening between the door and the body paneling 11 which is similar to the closure element 54 of Fig. 9 with the exception that a plurality of the portions are employed so as to fold into a compact mass for storage. This construction, like that in Fig. 9, provides a metal closure which is substantially waterproof and which prevents entrance into the compartment in view of the closure element being made of metal and being locked to the door.

A plurality of nest U-shaped elements 64 are pivoted on the common pivot 65, preferably the pivot of the door 53, and have inter-related portions 66 which engage each other when the outer element 64 is pulled outwardly to pull the inner element 64 against the paneling 11 to have a flange 67 thereof form a seal with the marginal edge of the paneling 11. Control elements 61, 62, and 63 are provided on the door to retain the door in open position, while a cushioned bumper 68 is utilized for positioning the elements 64 in nested relation out of contact with the compartment floor which is elevated to clear a gas tank 69 and which would prevent the unit element 54 of Fig. 9 from being employed. It will be noted in Fig. 12 that the joining portions 66 of the elements 64 extend along the side so as to effectively seal the covering against the entrance of moisture.

In Figs. 13 to 15, I have shown a modified form of constructure wherein a plurality of side elements 71 are interengaged by projecting portions 66, as illustrated in Fig. 14, and which may be constructed to have the outer element secured to the door and the remainder of the elements pivoted on the common pivot 65 for the door. Upon opening the door, the elements 71 are moved outwardly therewith to close the side of the compartment opening.

I have illustrated a flexible metal top element 72 which may be rolled over the roller 73 or moved inwardly of the compartment in a well-known manner when released from the door. The lock 74 of the door may be employed to engage a tang or side of an aperture on the outer edge of the top for locking the compartment. When the lock is turned to unlatched position the top may be rolled up on the roller 73 and through the release of the arm 63, the door 53 may be closed, while moving the elements 71 to nested position. The side edges of the top 72 may be provided with rubber strips 75, as illustrated in Fig. 13, for the purpose of forming a seal with the inwardly directed flanges 76 on the elements 71.

By this means a thief-proof trunk compartment is provided at the rear of vehicle bodies which may be disposed out of view and which is effectively sealed against entrance of moisture. This construction materially enhances the vehicle body and provides a trunk compartment through the removable or extensible frame. The frame may be removable entirely from the body or may be hinged inwardly of the compartment to be invisible or substantially invisible from the exterior of the vehicle.

While I have described and illustrated several embodiments of my invention, it will be apparent to those skilled in the art that various changes, omissions, additions and substitutions may be made therein without departing from the spirit and scope of my invention, as set forth in the accompanying claims.

I claim as my invention:

1. A vehicle body having a compartment at the rear thereof defined by the marginal edge of the paneling, a frame extending beyond said edge and pivoted for outward movement, a door pivoted on said frame, and means for sealing said frame at said marginal edge.

2. A vehicle body having a compartment at the rear thereof defined by the marginal edge of the paneling, a frame extending beyond said edge and pivoted for outward movement, a door carried by said frame, means for sealing said frame at said marginal edge, and means for securing said frame when disposed within the compartment and when extended therefrom.

3. The combination with a vehicle body having a sloping rear portion forming a compartment at the rear thereof, of a door for said compartment likewise sloping when in closed position, means for limiting the opening movement of said door to substantially a vertical position, and a fabric cover spanning said door and body and extending along the sides to form a closure for said opening between said door and body, laterally extending ribs in said cover, and longitudinally extending reinforcing elements likewise in said cover, said laterally and longitudinally extending members cooperating with each other to provide a desired form for said cover when disposed between said door and body.

CHARLES H. WIDMAN.